(12) United States Patent
Hirota

(10) Patent No.: US 6,636,018 B2
(45) Date of Patent: Oct. 21, 2003

(54) BATTERY MODULE AND POSITIONING STRUCTURE THEREFOR

(76) Inventor: Hiroyuki Hirota, c/o Kyocera Corporation, Yokohama Office 1-1, Kagahara 2-chome, Tsuzuki-ku, Yokohama-shi, Kanagawa-ken (JP)

( * ) Notice: Subject to any disclaimer, the term of this patent is extended or adjusted under 35 U.S.C. 154(b) by 0 days.

(21) Appl. No.: 10/033,762

(22) Filed: Dec. 28, 2001

(65) Prior Publication Data
US 2002/0125856 A1 Sep. 12, 2002

(30) Foreign Application Priority Data
Mar. 2, 2001 (JP) ........................................ 2001-058650

(51) Int. Cl.[7] ................................................ H02J 7/00
(52) U.S. Cl. ...................................................... 320/110
(58) Field of Search ............................... 320/107, 110, 320/112, 113, 114, 115

(56) References Cited

U.S. PATENT DOCUMENTS

| 5,070,929 A | * 12/1991 | Goka et al. | 164/235 |
| 5,225,486 A | * 7/1993 | Money et al. | 525/113 |
| 6,184,658 B1 | 2/2001 | Mori et al. | |
| 6,204,631 B1 | * 3/2001 | Kaiwa et al. | 320/107 |

FOREIGN PATENT DOCUMENTS

| JP | 3049346 | * | 6/1989 |
| JP | Hei 1-107873 | | 7/1989 |
| JP | 4-92362 | | 3/1992 |
| JP | 10-188931 | | 7/1998 |
| JP | 11-283593 | | 10/1999 |
| JP | 2000-315483 | | 2/2000 |
| JP | 2000315483 A | | 11/2000 |
| JP | 2000-315483 | | 11/2000 |

* cited by examiner

*Primary Examiner*—Edward H. Tso
*Assistant Examiner*—Pia F Tibbits
(74) *Attorney, Agent, or Firm*—Joel E. Lutzker, Esq.; Anna Vishev, Esq.; Schulte, Roth & Zabel LLP

(57) ABSTRACT

A battery module is provided by coating selected sides of a battery cell having a rectangular shape with a prescribed resin material. The resin material is selected from among polyamide resin, polyurethane resin. Module side surfaces are provided with slopes having the slope angle of 5° or more in the thickness direction. A positioning structure is provided for establishing the prescribed positioning between the battery module and its counterpart unit such as a cellular phone having a hollow space. A plurality of slopes are formed along side walls of the hollow space to provide complementary shapes to the sloped module side surfaces. When the battery module is installed in the hollow space, the module side surfaces slide along and come in close contact with the slopes of the side walls of the hollow space.

15 Claims, 4 Drawing Sheets

BATTERY MODULE AND POSITIONING STRUCTURE THEREFOR

BACKGROUND OF THE INVENTION

1. Field of the Invention

This invention relates to battery modules that are installed in portable electronic and telephone devices such as cellular phones, digital cameras, PHS terminals ('PHS' is an abbreviation for 'Portable Handyphone System') and the like. This invention also relates to positioning structures for firmly holding battery modules in prescribed positions within portable electronic telephone devices.

2. Description of the Related Art

Battery modules are conventionally and widely used in portable and electronic telephone devices such as digital cameras, cellular phones, PHS terminals and the like. A typical example of the battery module comprises a battery cell, a circuit board for mounting circuit components for use in charging control, insulation and electrical protection of the battery cell, and a connector providing connection with the main unit of the cellular phone. This was disclosed in various documents such as Japanese Unexamined Patent Publication No. 2000-315483.

The circuit board has terminals that are respectively connected to a positive electrode terminal and a negative electrode terminal of the battery cell, and it is connected with the connector by an exposed harness. The circuit board and the battery cell are integrally formed together with a covering resin material. The battery cell is typically small and light in weight because it is to be installed in a very small space within a cellular phone. In general, the battery cell is designed as a thin plate having a rectangular shape. A pair of opposite side surfaces of the battery cell providing the positive and negative electrode terminals are coated with the resin material. Thus, the battery module is formed by coating areas of the battery cell that contain a pair of opposite side surfaces, with resin.

Forming and shaping of the battery module is made in accordance with shaping characteristics of the battery cell, which is a thin, rectangular plate subjected to resin coating. The general process for producing the battery module contains three steps as follows:

(i) The battery cell is held in a metal mold comprising a plurality of mold members, which can be separated from each other in the thickness direction of the battery cell.

(ii) The resin is caused to flow into the gap formed between the battery cell and the cavity surface of the metal mold.

(iii) The battery module formed with the resin is then separated from the metal mold. That is, when the metal mold is opened, the battery module is held in the cavity of a mold member. An appropriate means, such as an ejector, is used to urge the battery module in its thickness direction, so that the battery module may be extracted or ejected from the metal mold.

In order to simplify the separation of the resin-shaped battery module from the metal mold, so-called 'extract slopes' are provided on side surfaces of the battery module. Generally speaking, an extract slope has a prescribed slope angle, which ranges between approximately 0.5° and 2.0°. These slopes are made very small, so that they may not be visually noticed when viewing the battery module of the thin-plate shape.

The aforementioned battery module should be firmly held in the prescribed space of the cellular phone to avoid unwanted movement thereof while the cellular phone is being carried or transported. That is, the battery module is subjected to positioning such that it is firmly secured and held in a concave or hollow space provided inside the cellular phone.

It is not preferable that a cellular phone employ a complicated positioning structure, causing an increase in the number of parts, the number of assembly steps, and, consequently, the manufacturing cost. Due to the aforementioned small extract slopes being formed on side surfaces of the battery module, it is very difficult to shape the hollow space to match the external configuration of the battery module with a high precision.

If the hollow space is shaped to match the external configuration of the battery module with a high precision, the cellular phone provides a very small clearance for allowing the battery module to be inserted into the hollow space. It will be difficult for an installer to assemble the battery module and to insert it precisely into the hollow space of the cellular phone when the clearance is so small.

SUMMARY OF THE INVENTION

It is an object of the invention to provide a battery module which can be easily manufactured at low cost.

It is another object of the invention to provide a positioning structure for positioning and firmly holding the battery module in a prescribed portion within a cellular phone.

A battery module of this invention is produced by coating selected sides of a rectangular, thin-plate battery cell with a prescribed resin material having a low softening temperature and low viscosity in melting, for example, polyamide resin, polyurethane resin, or polyolefin resin. In accordance with the invention, the battery module side surfaces are provided with slopes having the same slope angle of 5° or more in the thickness direction. As a result, upper side edges of the battery module are distanced farther apart from each other than its lower side edges. Preferably, the slope angle ranges between 5° and 10°. In addition, it is possible to provide a cover member for entirely covering an upper surface of the battery cell.

A positioning structure is provided in accordance with this invention for establishing the prescribed positioning between the battery module and its counterpart unit such as a compartment of a cellular phone having a hollow space. Slopes are formed along side walls of the hollow space to provide complementary shapes to the sloped module side surfaces. Thus, when the battery module is installed in the hollow space, the sloped module side surfaces slide along and come in close contact with the slopes of the side walls of the hollow space.

Due to the provision of the relatively large slopes to the module side surfaces of the battery module as well as the side walls of the hollow space of the counterpart unit, it is possible to improve the manufacturing process, especially in assembling the battery module and its counterpart unit (i.e., the accommodating part) together.

The above and other objects, aspects, features and advantages of the invention will be more readily apparent from the description of the preferred embodiments thereof taken in conjunction with the accompanying drawings and appended claims.

BRIEF DESCRIPTION OF THE DRAWINGS

The invention is illustrated by way of example and not limitation and the figures of the accompanying drawings in which like references denote like or corresponding parts, and in which.

DESCRIPTION OF THE PREFERRED EMBODIMENTS

This invention will be described in further detail by way of examples with reference to the accompanying drawings.

Figure 1:
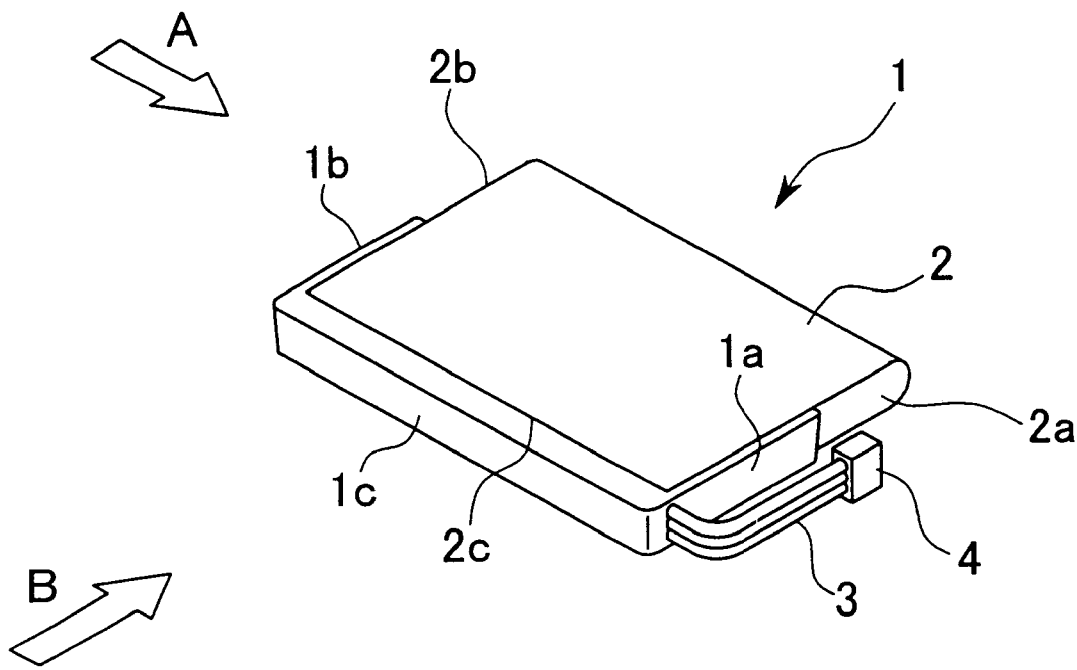
FIG. 1 is a perspective view showing an appearance of a battery module in accordance with a first embodiment of the invention.

FIG. 1 shows an appearance of a battery module 1 in accordance with a first embodiment of the invention, wherein reference numeral 2 designates a battery cell which is a thin plate having an approximately rectangular shape and is enclosed in a case produced by deep drawing (or reducing) formation of an aluminum material, for example. Reference numerals 2a and 2b designate a pair of opposite side surfaces of the battery cell 2, and reference numeral 2c designates a third side surface of the battery cell that joins the side surfaces 2a and 2b, respectively. The battery module 1 is formed by coating a part of the opposite side surfaces 2a and 2b, as well as the adjoining side surface 2c, of the battery cell 2 with resin. Reference numerals 3 and 4 designate a harness and a connector, respectively, that are provided in connection with the side surface 2a of the battery cell 2.

Normally, the battery cell 2 does not have a sufficient strength resisting severe conditions of high temperature and high pressure. For this reason, the process of injection molding, which is generally performed under conditions of high temperature and high pressure, can not be used to manufacture the battery module. Hence, the resin coating and forming for peripheral areas of the battery cell 2 are performed using a resin material, which has a relatively low softening temperature and relatively low viscosity in melting, under moderate conditions of low temperature and low pressure. Polyamide resin, polyurethane resin, or polyolefin resin are examples of suitable resin materials.

Figure 2:
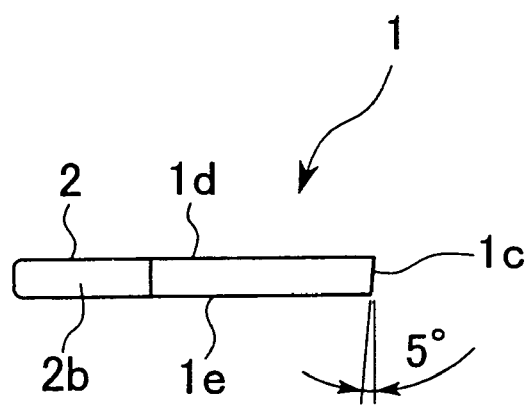
FIG. 2 is a side view of the battery module taken in direction A of FIG. 1.
Figure 3A:
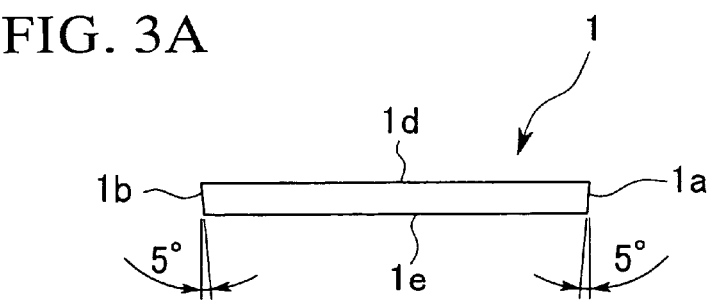
FIG. 3A is a side view of the battery module taken in direction B of FIG. 1.

Module side surfaces 1a, 1b, and 1c are respectively formed by resin coating and forming along the side surfaces 2a, 2b, and 2c of the battery cell 2, in the battery module 1 of the present embodiment. Details of the external configuration of the battery module 1 in view of its side surfaces will be described with reference to FIGS. 2, 3A, and 3B. FIG. 2 is a side view of the battery module shown in FIG. 1, taken in the direction of arrow A to diagrammatically show the side surface 2b of the battery cell 2 partly coated with the resin. FIG. 3A is a side view of the battery module shown in FIG. 1, taken in the direction of arrow B to diagrammatically show the side surface 2c of the battery cell 2, i.e., the module side surface 1c of the battery module 1, wherein reference numerals 1d and 1e designate an upper surface and a lower surface of the battery module 1, respectively. As shown in FIGS. 2 and 3A, the module side surfaces 1a, 1b, and 1c are respectively slanted against the vertical line in the thickness direction of the battery module 1 by a certain slope angle of 5°. That is, an upper side edge, i.e., the edge between the upper surface 1d and side surface 1a, 1b, and 1c, is slightly projected as compared with a lower side edge, i.e., the edge between the lower surface 1e and side surfaces 1a, 1b, and 1c.

Viewing from the direction B, FIG. 3A shows the module side surfaces 1a and 1b corresponding to a pair of the opposite cell side surfaces 2a and 2b, which are respectively coated with resin such that their upper side edges (corresponding to the upper surface 1d) are spaced farther apart as compared with their lower side edges (corresponding to the lower surface 1e) by the certain slope angle of 5°. The resulting angle between the two sloping sides 1a and 1b is 10°. Incidentally, FIGS. 3A and 3b do not show the harness 3 and the connector 4 to simplify the illustrations thereof.

Suppose that the battery module 1 has a thickness of approximately 4 mm and is slanted on both sides in the thickness direction thereof by the slope angle of 5°. Such slope angle provides a difference of dimensions between the upper surface 1d and the lower surface 1e of the battery module 1, and the difference on each side is calculated as follows:

$$4 \text{ mm} \times \tan 5° \approx 0.35 \text{ mm}$$

Therefore, the slope angle of 5° on each side of the battery module provides the total difference of approximately 0.7 mm between the upper surface and the lower surface of the battery module 1.

Due to the provision of the aforementioned slopes in the module side surfaces 1a, 1b, and 1c of the battery module 1, shown in FIGS. 2 and 3A, an installer is capable of clearly visually recognizing differences of dimensions between the upper surface 1d and the lower surface 1e of the battery module 1 during manufacture. This allows the installer to properly and easily handle the battery module 1 without making a mistake in visual recognition even though the battery module 1 does not provide special signs or indications for making distinctions between the upper side and lower side of the battery module 1.

Figure 3B:
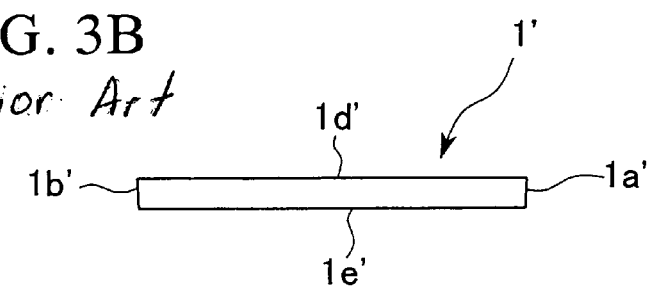
FIG. 3B is a side view showing a prior art comparative example of the battery module having smaller slope angles as compared to the battery module shown in FIG. 3A.

FIG. 3B shows a side view of a prior art battery module 1' having module side surfaces 1a' and 1b', an upper surface 1d', and a lower surface 1e'. This battery module 1' is a comparative example in which both of the module side surfaces 1a' and 1b' are slanted by the same slope angle of 2° in comparison with the battery module 1 having the relatively large slope angle of 5°. FIG. 3B clearly shows that the battery module 1' provides a relatively 'small' difference in dimensions between the upper surface 1d' and the lower surface 1e', which cannot be easily, visually recognized. As compared with the prior art comparative example shown in FIG. 3B, the battery module 1 shown in FIG. 3A provides clear visual indication with respect to the differences in dimensions between the upper surface 1d and the lower surface 1e, due to the provision of the relatively large slope angle of 5° along the side surfaces 1a, 1b, and 1c.

Figure 4:
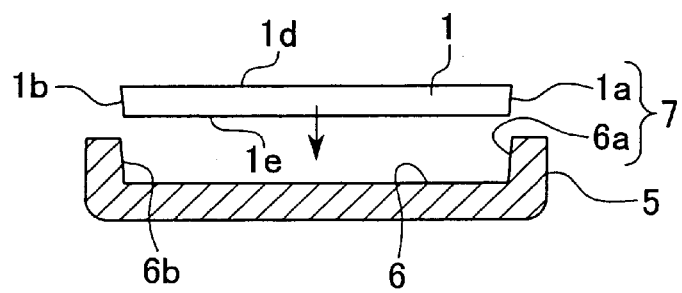
FIG. 4 is a side view partly in section showing insertion of the battery module into a compartment of a cellular phone in manufacture.

As shown in FIG. 4, the battery module 1 of the present embodiment is installed and held in a counterpart unit, namely, a compartment 5, of a cellular phone (not shown) with mutual positioning therebetween. The compartment 5 of the cellular phone provides a hollow space 6 for holding the battery module 1. To accommodate the sloping module side surfaces 1a, 1b and 1c of the battery module 1, side walls of the hollow space 6 have complementary sloping shapes. Specifically, as shown in FIG. 4, side surfaces 6a and 6b of the hollow space 6, are slanted in a depth direction by a slope angle of 5° to provide a broader opening for the sloped module side surfaces 1a and 1b of the battery module 1. Consequently, the hollow space 6 is slightly broadened in the opening thereof to easily accommodate the battery module 1. When the battery module 1 is installed in the hollow space 6 of the compartment 5, the sloped module side surfaces 1a and 1b are brought in contact with the sloped sides 6a and 6b respectively. Combinations of the module side surfaces 1a and 1b, and the slopes 6a and 6b constitute a positioning structure 7.

The present embodiment is characterized by providing the 'specially-designed' battery module 1 and its positioning structure 7 for use in the cellular phone. During the manufacturing process, an installer first arranges the compartment 5 of the cellular phone such that the gradually widening opening of the hollow space 6 widens in an upward direction. The connector 4 of the battery module 1 is then connected to a connector (not shown) of the cellular phone. Next, the installer holds the battery module 1 so that its narrower side (i.e., lower surface 1e) is directed downwardly towards the bottom of the compartment 5, and the battery module 1 is then merely dropped down into the hollow space 6. Thus, the prescribed positioning is established with the certainty required for securely fixing the battery module 1 in the hollow space 6.

In the present embodiment, the lower side 1e of the battery module 1 has relatively small dimensions in the width direction thereof and is firstly inserted into the hollow space 6. In order to allow the battery module 1 to be entirely held inside of the hollow space 6 including its upper side 1d, the opening of the hollow space 6 has relatively large dimensions, which are preferably larger than dimensions of the upper side 1d of the battery module 1 in its width direction. That is, the opening of the hollow space 6 has sufficiently large dimensions as compared to the firstly-inserted portion (i.e., lower side 1e) of the battery module 1. In the embodiment of the battery module 1 having a thickness of approximately 4 mm with the slope angle of 5°, for example, the opening of the hollow space 6 is larger than the lower side 1e of the battery module 1 by 0.7 mm or more. This eliminates the strict positioning which is conventionally required during the manufacturing process to insert the battery module into the hollow space of the compartment of the cellular phone. Hence, the installer is not required to pay careful attention to positioning and is only required to perform 'rough' positioning for insertion of the battery module 1 into the hollow space 6. In the roughly positioned state, the worker merely drops or arranges the battery module 1 into the hollow space 6, so that the battery module 1 is automatically fitted into the hollow space 6. Herein, the module side surfaces 1a, 1b, and 1c of the battery module 1 slide along the slopes 6a, 6b, and 6c of the hollow space 6 (where reference numeral '6c' is not shown in FIG. 4), so that the battery module 1 is completely located inside of the hollow space 6.

Figure 5:
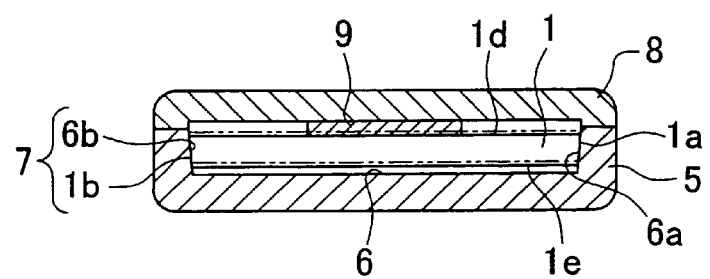
FIG. 5 is a sectional view of a compartment of a cellular phone for containing the battery module that has small variations of dimensions in its width direction.

As shown in FIG. 5, after the battery module 1 is securely arranged within the hollow space 6, a cover member 8 is attached to the compartment 5 to press the battery module 1 farther in the depth direction of the hollow space 6. Thus, it is possible to completely secure the battery module 1 in the compartment 5 of the cellular phone.

According to the present embodiment, the positioning structure 7 provides the 'slanted' module side surfaces 1a and 1b of the battery module 1, which are slanted by the prescribed slope angle of 5° respectively, and the sloped sides 6a and 6b of the hollow space 6 of the shapes where sloped sides 6a and 6b are complementary to the module side surfaces 1a and 1b respectively. Thus, the positioning structure 7 automatically establishes the prescribed positioning by only bringing the module side surfaces 1a and 1b in contact with the sloped sides 6a and 6b respectively. Due to the provision of the positioning structure 7, it is possible to tightly secure the battery module 1 in the compartment 5 of the cellular phone even though the battery module 1 and the hollow space of the compartment 5 has a relatively low precision of dimensions in manufacture.

FIG. 5 shows an example of installation of the battery module 1 being secured in the hollow space 6 having its opening covered with the cover member 8. When small variations occur in dimensions of the battery module 1 in its width direction, the battery module 1 is slightly moved in the depth direction of the hollow space 6 as shown by dashed lines shown in FIG. 5. Adequately moving the battery module 1 may absorb such small variations of dimensions of the battery module 1 in its width direction, thus making it possible to establish the prescribed positioning with the required precision by tightly securing the battery module 1 within the hollow space 6. An elastic member 9 may be attached to the backside of the cover member 8 for restricting movement of the battery module 1 within the hollow space 6 in its depth direction. The elastic member 9 presses the battery module 1 downwards while absorbing positional variations of the battery module 1 within the hollow space 6. A piece of rubber, sponge, or a spring may be used as the elastic member.

The battery module 1 of the present embodiment is designed in a thin-plate-like shape in conformity with the foregoing shape characteristics of the battery cell 2. The battery module 1 is formed by using a metal mold (not shown), which is divided into clamped mold members which can be separated from each other in the thickness direction of the battery module 1. The battery module 1 is formed in the space between the clamped mold members. When the metal mold is opened, the battery cell 1 remains in the cavity of one mold member and is removed from the metal mold by ejection in the thickness direction thereof.

In the present embodiment, the battery module 1 is made of the prescribed resin material such as the polyamide resin, polyurethane resin or polyolefin resin. These resin materials provide good moldability under low temperature and low pressure conditions. These materials also have relatively low viscosities, so that they are easily melted under low temperature conditions. Having good adhesive properties, these resin materials may act as adhesives so that the battery module is easily adhered to surfaces of the cavity of the metal mold. These adhesive properties of the utilized materials may cause problems in that the battery module may be difficult to separate from the metal mold.

To enable an easy removal of the molded battery module 1, the present embodiment provides the battery modules with sloped side surfaces 1a to 1c, having the described slope angle of 5° in the thickness direction of the battery cell 2. The slopes of the module side surfaces 1a–1c are used as 'extract slopes', which allow the molded battery module 1, to be separable from the metal mold with ease.

The present embodiment sets the slope angle of 5° to all of the module side surfaces 1a–1c. Of course, this invention is not limited to the present embodiment with respect to the slope angle. It is possible to use an arbitrary slope angle which is 5° or more. In order to use the slopes of the module side surfaces 1a-1c as the extract slopes, it is preferable to set the slope angle in the range between 5° and 15°. Optimally, the slope angle is set in a narrower range between 5° and 10°.

A second embodiment of a battery module and its positioning structure of the invention will be described with reference to FIGS. 6 to 9.

Figure 6:
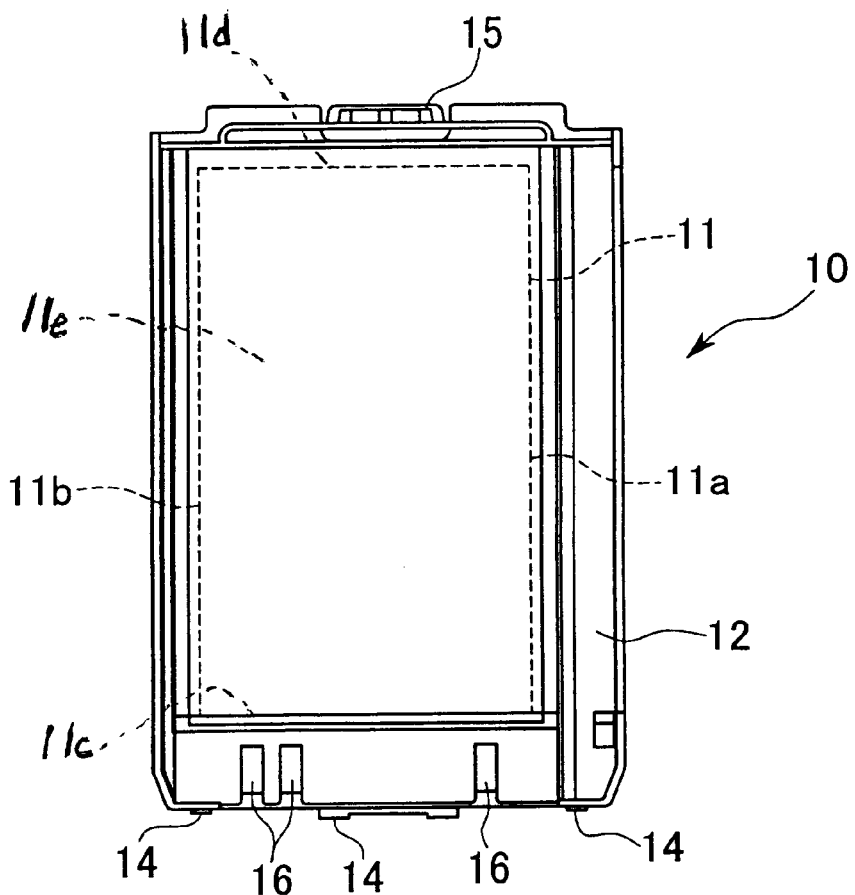
FIG. 6 is a plan view showing a battery module in accordance with a second embodiment of the invention.

FIG. 6 shows a battery module 10 for use in a cellular phone in accordance with the second embodiment. The battery module 10 contains a battery cell 11 that is designed as a thin plate having a rectangular shape. Reference numerals 11a to 11d designate four side surfaces of the battery cell 11, and reference numeral 11e designates an upper surface of the battery cell 11. All of the four side surfaces 11a–11d and the upper surface 11e of the battery cell 11 are coated with the resin so that a cover member 12 is integrally formed on the upper surface 11e of the battery cell 11. Reference numerals 10a and 10b (shown in FIGS. 7 and 9) designate module side surfaces of the battery module 10 that are formed by the resin upon the side surfaces 11a and 11b respectively, of the battery cell 11. Similar to the foregoing first embodiment, the module side surfaces 10a and 10b of the second embodiment provided with slopes having an angle of 5° (see FIG. 7).

Figure 7:
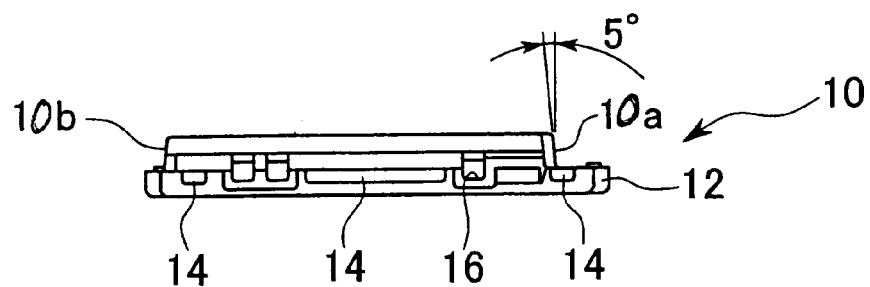
FIG. 7 is a side view of the battery module shown in FIG. 6 wherein slopes are formed on module side surfaces with a certain slope angle in a thickness direction.
Figure 8:
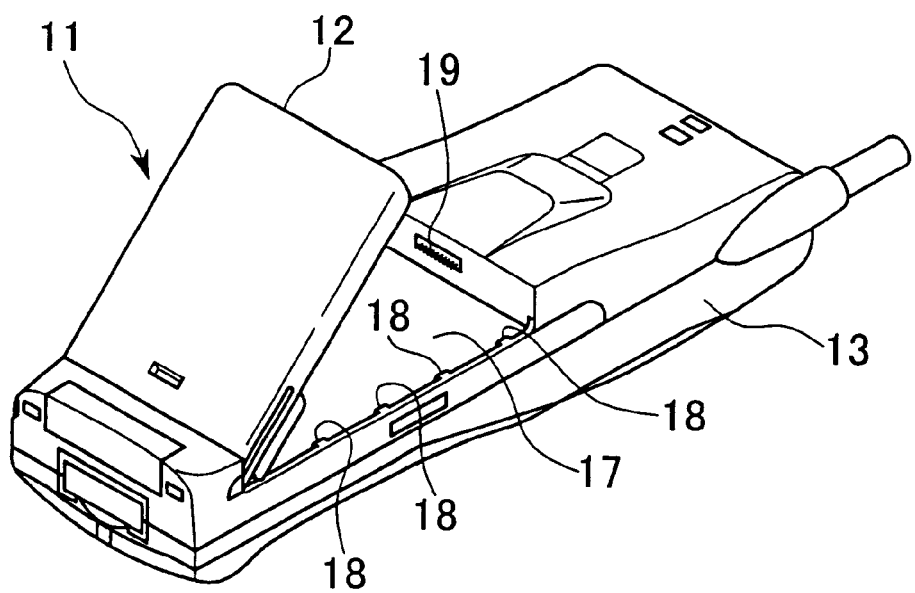
FIG. 8 is a perspective view showing a cellular phone having a hollow space accommodating the battery module shown in FIG. 6.
Figure 9:
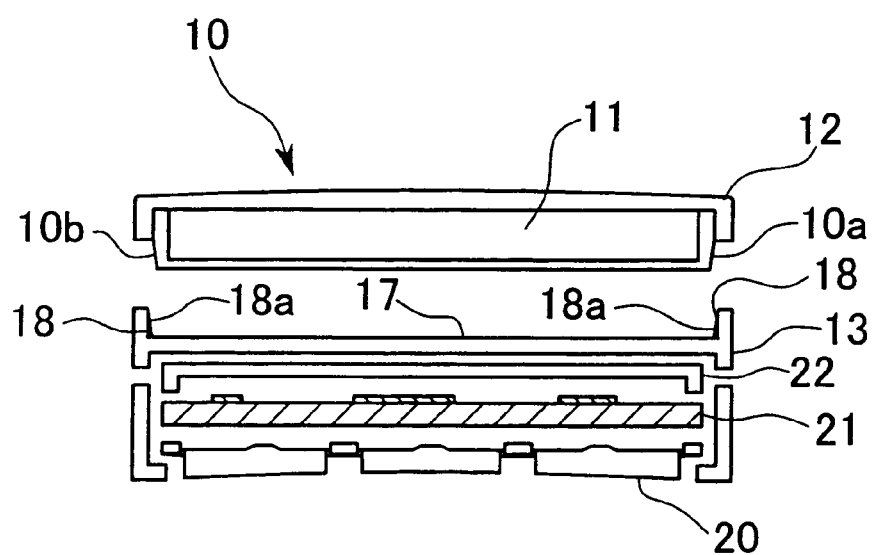
FIG. 9 is a sectional view showing installation of the battery modules in the hollow space in the cellular phone.

FIG. 8 shows a perspective view of a cellular phone 13, and FIG. 9 shows an installation of the battery module 10 into a prescribed hollow space 17 of the cellular phone 13. As shown in FIGS. 6 and 7, the cover member 12 is integrally formed with the battery cell 11 and is provided with projections 14 and an attach/detach operator 15. Projections 14 are used to attach the cover member 12 to the hollow space of the cellular phone 13. The attach/detach operator 15 is used for attachment and detachment of the cover member 12 from the cellular phone 13. In addition, reference numerals 16 designate exposed contact terminals that are arranged inside the resin forming the cover member 12. These contact terminals 16 are brought in contact with electrodes (not shown) of the cellular phone 13 when the battery module 10 is properly installed in the hollow space 17 of the cellular phone 13.

The hollow space 17 is shown in FIGS. 8 and 9 for installing the battery cell 11 of the battery module 10. Preferably, the hollow space 17 holds a part of the battery cell 11 that is not covered with the cover member 12. Fixing ribs 18 are arranged with prescribed spacing therebetween on side walls of the hollow space 17. Ribs are provided with slopes 18a substantially matching the slopes of the module side surfaces 10a and 10b of the battery module 10. The hollow space 17 of the cellular phone 13 is also provided with recesses (not shown) for engaging with the projections 14 of the cover member 12 of the battery module 10. In addition, it is also provided with a recess (or concavity) 19 for engaging the attach/detach operator 15 of the cover member 12 of the battery module 10.

As shown in FIG. 9, fixing ribs 18 arranged on the side walls of the hollow space 17 are shaped complementarily to the module side surfaces 10a and 10b of the battery module 10. When the battery module 10 is installed in the hollow space 17 of the cellular phone 13 so that the cover member 12 completely closes, the required positioning is automatically established in such a way that the module side surfaces 10a and 10b of the battery module 10 are brought in contact with the slopes 18a of the fixing ribs 18 in the hollow space 17.

In FIG. 9, reference numeral 20 designates numeric keypads of the cellular phone 13; reference numeral 21 designates a circuit board provided inside of the cellular phone 13; and reference numeral 22 designates a shield member that is arranged between the battery module 10 and the circuit board 21.

Next, a description will be given with respect to manual operations for installing the battery module 10 into the hollow space 17 of the cellular phone 13. First, the installer holds the battery module 10 with the cover member 12 so that projections 14 are respectively inserted into the recesses (not shown) of the hollow space 17 of the cellular phone 13. Then, the cover member 12 of the battery module 10 towards the bottom of the hollow space 17 is pivotally moved so that the battery cell 11 integrally formed with the cover member 12 is placed into the hollow space 17 of the cellular phone 13. Because of the provision of the fixing ribs 18 in the hollow space 17, the battery module 10 is automatically guided and is positioned in such a way that the module side surfaces 10a and 10b slide along the slopes 18a of the fixing ribs 18. When the attach/detach operator 15 of the cover member 12 comes into the engagement with the recess 19 of the hollow space 17, the prescribed positioning is securely established such that the module side surfaces 10a and 10b are brought into tight contact with the slopes 18a of the fixing ribs 18 in the hollow space 17 of the cellular phone 13.

Projections 14 of the cover member 12 are preferably loosely engaged with the recesses of the hollow space 17 with a certain amount of play or clearance. In other words, although the projections 14 are engaged with the recesses of the hollow space 17 with fine clearance, it is possible to establish the prescribed positioning with a required certainty because of cooperative actions of the fixing ribs 18 with the module side surfaces 10a and 10b having the slopes substantially matching the slopes 18a of the fixing ribs 18 in the hollow space 17.

The aforementioned embodiments are described with respect to the battery modules 1 and 10 for use in portable telephone devices such as cellular phones and PHS terminals. The field in which this invention may be applied is not necessarily limited to that of portable telephone devices. Hence, the battery modules and their positioning structures of this invention can be applied to other devices such as digital cameras, handheld computers, communication terminals and the like.

As described heretofore, this invention has a variety of technical features and effects, which are described below.

(1) The battery module of this invention contains a battery cell of a thin plate type, which is coated with resin so that opposite module side surfaces thereof are respectively slanted by a certain slope angle of 5° or more sloping in the thickness direction. Therefore, the installer is capable of visually recognizing differences of dimensions between upper and lower surfaces of the battery module of the thin plate type. For example, for a battery module having a thickness of 4 mm, the difference between the upper and lower surfaces is approximately 0.35 mm on each side of the module. This difference is clearly visible by the installer. Thus slopes formed along the module side surfaces of the battery module allow the installer to easily handle the battery module in manufacture without error.

(2) The aforementioned slopes of the module side surfaces of the battery module can function as 'extract slopes' which allow the battery module to be easily extractable from the metal mold. Previously, angles of extract slopes were set in a narrow range between 0.5° and 2°. In contrast, this invention increases angles of extract slopes to 5° or more. This makes the battery module more easily separable from the metal mold, even though the battery module is formed using a highly adhesive resin such as the polyamide resin, polyurethane resin, and polyolefin resin.

(3) Using differences of dimensions between upper and lower surfaces of the battery module due to the aforementioned slopes of the module side surfaces allows the installer to handle insertion of the battery module into the prescribed hollow space of its accommodating part (e.g., compartment of the cellular phone) with ease.

(4) The module side surfaces of the battery module are slanted in such a way that upper edges thereof are located farther apart as compared with lower edges thereof. This provides a total slope angle of 10°, as measured between the two module side surfaces. Thus, the effects of this invention double by the provision of the relatively large slopes along the module side surfaces of the battery module.

(5) The positioning structure for the battery module of this invention automatically establishes the required relative positioning between the slopes of the module side surfaces and their complementary slopes formed along side walls of the hollow space of the cellular phone. When the battery module is installed into the hollow space of the cellular phone, the module side surfaces slide along and come into close contact with their complementary slopes formed along the side walls of the hollow space. For this reason, the installer is capable of simply making rough positioning between the battery module and the hollow space of the cellular phone without error. The installer is not required to make fine adjustment in positioning later and does not encounter trouble in assembling the battery module and its corresponding compartment together. This greatly contributes to the improvement in the process of installation of battery cells into their designated hollow spaces of devices.

(6) The positioning structure of this invention automatically establishes the prescribed positioning between the battery module and the cellular phone because the side walls of the hollow space are provided with the slopes substantially matching the slopes of the module side surfaces. Therefore, even if the battery module or its counterpart unit has a relatively low precision in dimensions, or the components differ in their width dimensions, it is possible to easily absorb such difference in dimensions by slightly shifting the positional relationship between the battery module and its counterpart unit in the thickness direction. Thus, the positioning structure of this invention is capable of accurately positioning the battery module in the hollow space of the cellular phone regardless of dispersions or variations of dimensions of the components of the battery module.

As this invention may be embodied in several forms without departing from the spirit or essential characteristics thereof, the present embodiments are therefore illustrative and not restrictive, since the scope of the invention is defined by the appended claims rather than by the description preceding them, and all changes that fall within metes and bounds of the claims, or equivalents of such metes and bounds are therefore intended to be embraced by the claims.

What is claimed is:

1. A battery module comprising:
   a battery cell having at least one side surface; and
   at least one module side extraction surface formed by coating said at least one side surface of said battery cell with a resin material, said resin material having a low softening temperature and a low viscosity in melting,
   wherein an entire width of said module side extraction surface comprises a slope having a slope angle of not less than 5° in a thickness direction of said battery cell.

2. A battery module according to claim 1, wherein said resin material is selected from the group consisting of polyamide resin, polyurethane resin, and polyolefin resin.

3. A battery module according to claim 1, wherein said slope angle ranges between 5° and 10°.

4. A battery module according to claim 1, wherein said battery cell further comprises an upper surface and wherein said battery module further comprises a cover member for entirely covering said upper surface of said battery cell.

5. A battery module comprising:
   a battery cell having a pair of opposite sides; and
   a pair of module side extraction surfaces formed by coating said pair of opposite sides of said battery cell with a resin material having a low softening temperature and a low viscosity in melting,
   wherein each of said pair of module side extraction surfaces comprises an upper edge, a lower edge and a slope, said slope extending along an entire width of said module side extraction surface and having a slope angle of not less than 5° in a thickness direction of said battery cell and said upper edges of said module side surfaces being spaced apart farther than said lower edges of said module side surfaces.

6. A battery module according to claim 5, wherein said resin material is selected from the group consisting of polyamide resin, polyurethane resin, and polyolefin resin.

7. A battery module according to claim 5, wherein said slope angle ranges between 5° and 10°.

8. A battery module according to claim 5, wherein said battery cell further comprises an upper surface and wherein said battery module further comprises a cover member for entirely covering said upper surface of said battery cell.

9. A positioning structure for establishing a prescribed positioning between a battery module and a hollow space of a portable device, said positioning structure comprising:
   a plurality of sloped module side extraction surfaces, each having a slope angle of not less than 5°, said sloped module side extraction surfaces being formed along entire widths of selected sides of said battery module; and
   a plurality of slopes formed along side walls of said hollow space, wherein said slopes of said hollow space comprise a complimentary shape to said sloped module side extraction surfaces so that when said battery module is installed in said hollow space, said sloped module side extraction surfaces slide along and come in close contact with said slopes of said hollow space.

10. A positioning structure according to claim 9, wherein said plurality of sloped module side surfaces are formed by a coating of resin material.

11. A positioning structure according to claim 10, wherein said resin material is selected from the group consisting of polyamide resin, polyurethane resin, and polyolefin resin.

12. A positioning structure according to claim 9, wherein said slope angle ranges between 5° and 10°.

13. A positioning structure according to claim 9 wherein said battery module further comprises an upper surface and wherein said positioning structure further comprises a cover structure member entirely covering said upper surface of said battery module.

14. A positioning structure according to claim 9, wherein said slopes of said hollow space are formed by arranging a plurality of sloped ribs along said side walls of said hollow space.

15. A positioning structure according to claim 9, wherein said portable device is a cellular phone.

* * * * *